United States Patent [19]

Dale, Jr. et al.

[11] 4,047,792
[45] Sept. 13, 1977

[54] TORQUE WHILE TURN-AROUND SCAN MIRROR ASSEMBLY

[75] Inventors: C. Harold Dale, Jr., Malibu; Spencer D. Howe; Robert L. Bonebreak, both of Los Angeles; Charles J. Starkus, Culver City, all of Calif.

[73] Assignee: Hughes Aircraft Company, Culver City, Calif.

[21] Appl. No.: 645,491

[22] Filed: Dec. 31, 1975

[51] Int. Cl.² .................................................. G02B 27/17
[52] U.S. Cl. .................................................. 350/6; 358/83
[58] Field of Search ............... 350/6, 285, 7; 178/7.6, 178/6.7, 5; 250/234

[56] References Cited

U.S. PATENT DOCUMENTS

| | | | |
|---|---|---|---|
| 3,386,786 | 6/1968 | Kaisler et al. | 350/6 |
| 3,532,408 | 10/1970 | Dostal | 350/6 |
| 3,671,766 | 6/1972 | Howe | 350/6 |
| 3,734,591 | 5/1973 | Howe | 350/6 |
| 3,883,737 | 5/1975 | Throssell et al. | 350/6 |
| 3,921,045 | 11/1975 | Reich et al. | 350/6 |
| 3,952,217 | 4/1976 | Rawlings | 178/7.6 |

Primary Examiner—John K. Corbin
Assistant Examiner—B. W. delos Reyes
Attorney, Agent, or Firm—Lawrence V. Link, Jr.; W. H. MacAllister

[57] ABSTRACT

A scan mirror assembly wherein the scan mirror performs near-linear cyclic two-way scans. During the useful portion of each scan half-cycle, the mirror is acted on only by the torque of the mounting flexural pivots and at turn-around most of the rotational energy of the mirror is returned thereto by a leaf spring bumper arrangement. A clock controlled "closed loop" torquer operates only during the turn-around period to provide for energy losses by adding that amount of energy required to maintain a scan rate equal to the clock rate.

8 Claims, 7 Drawing Figures

TORQUE WHILE TURN-AROUND SCAN MIRROR ASSEMBLY

BACKGROUND OF THE INVENTION

The subject invention relates generally to scanning devices and particularly to optical type scanning devices which have substantially linear cyclic two-way scans.

In certain optical imaging systems it is advantageous that the scanning member, e.g. an elliptical mirror, has a linear scan in both scanning directions. This may be accomplished by torquing only on the turn-around portion of each cycle; however, the turn-around periods (two per cycle) are normally much shorter in duration than either the forward or the reverse active scan period. Therefore everything else being equal, the torquing requirements must be significantly greater if the energy restoration is accomplished in a much shorter time period, i.e. as contrasted with prior art scanners wherein torque is applied during the longer duration of the retrace half operating cycle. Torquing during the retrace half cycle can produce a change in scan speeds of up to ±20% and complicated video signal processing would be required to align forward and reverse scan data such that equal object space scan angles are aligned in the final format (picture).

Also prior art scan devices generally consume excessive energy because in order to run smoothly, dampening of the mirror "rebound" is required; and because of the relative large mass of the bumpers of these prior art devices substantial energy is subtracted from the scan assembly at each impact. Also, impact with the relatively large mass of the prior art bumper arrangement tend to excite undesirable modes of mirror vibration, both as non-rigid body and as rigid body on pivots deflecting in shear.

SUMMARY OF THE INVENTION

One of the primary objects of the subject invention is to provide a scan assembly which produces substantially linear two-way scans.

Another object is to provide a scan assembly which consumes substantially less power than prior art scanning devices.

A further object is to provide a scan assembly which is capable of performing highly linear and repeatable scans in each of two scanning directions such that misregistration of instantaneous fields of view from scan to scan is minimized.

Still another object of the subject invention is to provide a scan mirror assembly which is capable of stable operations with a minimum of physical dampening of the scan member during turnaround, whereby power and torquer requirements are minimized.

Yet a further object is to provide a scan assembly adapted for optically scanning a field of view in a repetitive scan format that allows data reconstruction into a picture of low distortion without the need for processing the angle versus time aspects of the video signals.

In accordance with the subject invention, a scan mirror assembly is provided whereby the scan mirror performs near linear cyclic two-way scans. During the usable portion of each scan half cycle, the mirror is acted upon only by the torque of the mounting flexural pivots. Most of the rotational mirror energy is returned to the mirror during the turn-around period, at the end of a scan, by a leaf spring bumper arrangement. A clock controlled "close-loop" torquer operates only during the turnaround period to provide for energy losses by adding that amount of energy required to maintain a scan rate equal to the clock rate. In accordance with one preferred embodiment of the invention, two bumper bars are located equidistant from the pivot axis of rotation of the scan mirror. Two flat tapered leaf springs are contacted during each turn-around, with the taper being effective to minimize the mass/energy ratio of the spring as "seen" by the scan mirror member. Each spring deflects away from a damper pad which functions to dampen the ringing motion of the spring after it is out of contact with the bumper bar such that the spring will not be vibrating at the next impact time. A permanent magnet and sense coil are disposed so as to measure the velocity of the spring and the output signal therefrom, specifically when a sudden velocity of the spring occurs upon initial mirror contact, is used to synchronize the operation of circuit means which drives the torquer. The energy added by the torquer during the turn-around period is of precisely the correct amount such that the scan member runs at the clock controlled scan rate. The circuit which controls the torquer is a close loop implementation that utilizes position and velocity feedback control signals to achieve improved accuracy and stability.

BRIEF DESCRIPTION OF THE DRAWINGS

The novel features of the subject invention as well as the invention itself and the objects and advantages thereof, will be better understood from the accompanying description taken in conjunction with the accompanying drawings in which.

DETAILED DESCRIPTION OF THE INVENTION

Figure 1:
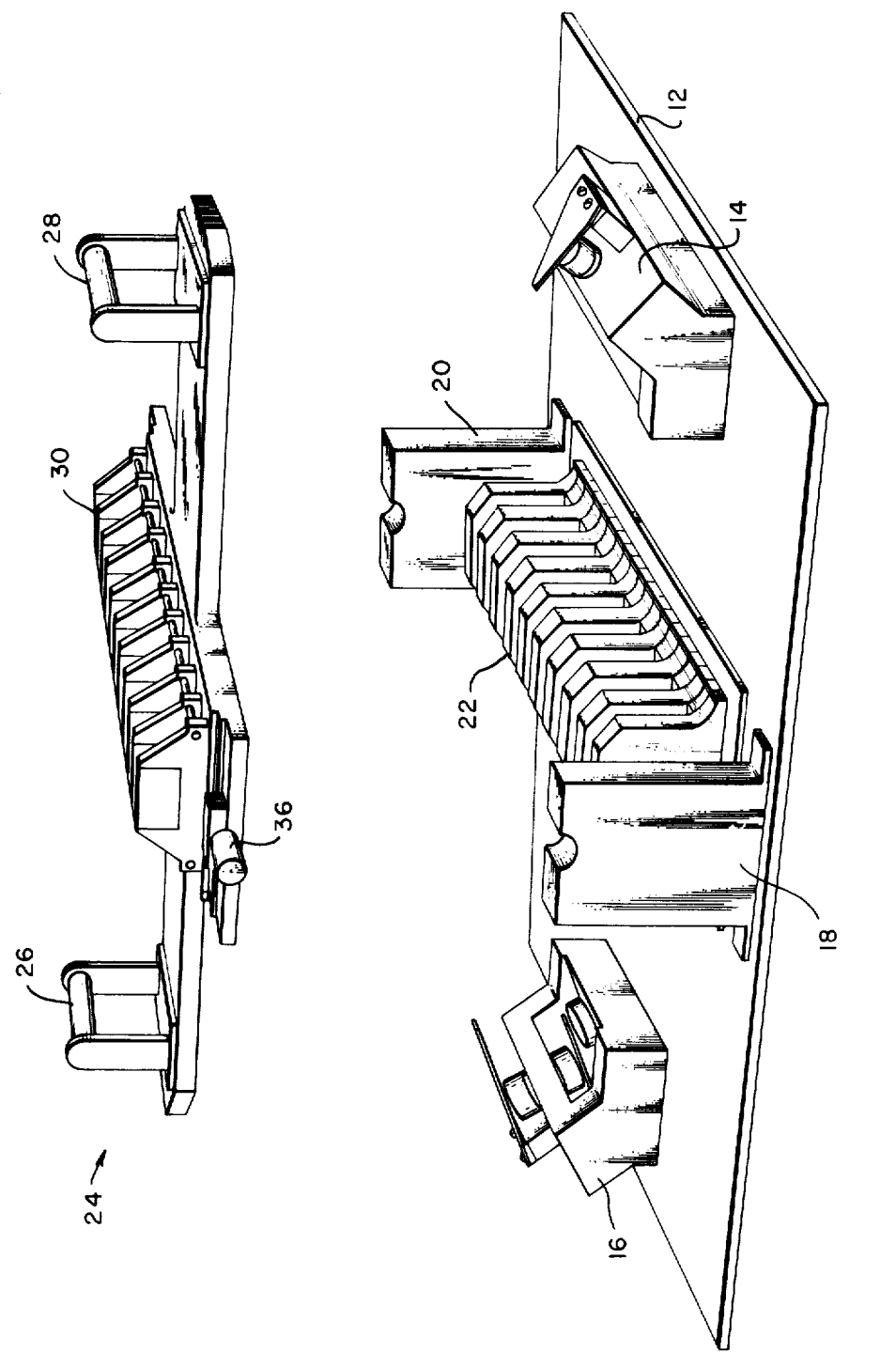
FIG. 1 is a perspective view of a scan mirror assembly in accordance with the subject invention in which the scan mirror member and the attached portion of the torquer are shown disassembled from the remainder of the assembly.
Figure 2:
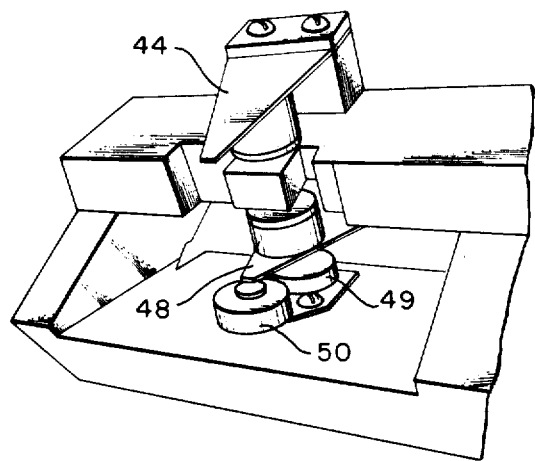
FIG. 2 is a perspective view of one of the leaf spring bumper arrangements and velocity sensors of FIG. 1.
Figure 3:
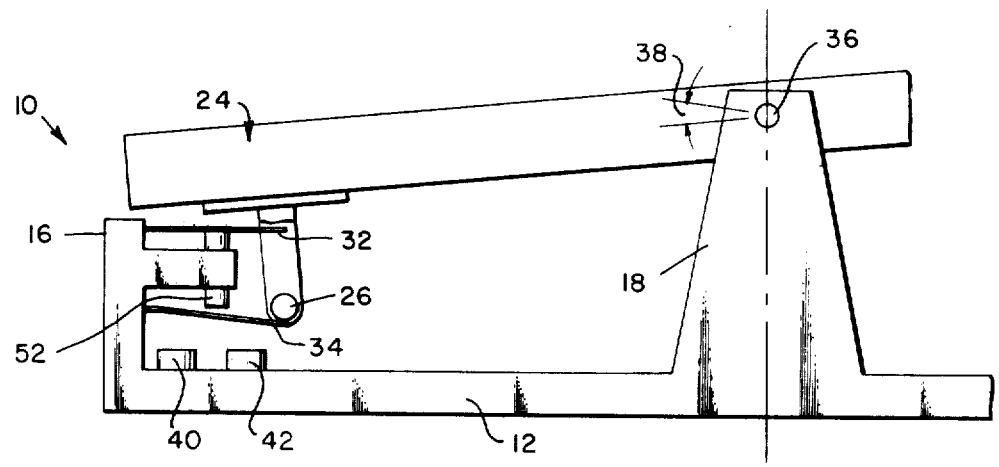
FIG. 3 is a schematic view of the left-hand half of the assembly scan mirror assembly of FIG. 1.

Referring first primarily to FIGS. 1-3, scan assembly 10 comprises a housing 12 on which is mounted leaf spring bumper arrangements 14 and 16 as well as journal support members 18 and 20. Also, the coils 22 of a torquer device are mounted on housing 12. A scan member 24 includes bumper bars 26 and 28 and magnetic plates 30 form the other portion of the torquer device. Leaf spring bumper arrangements 14 and 16 are identical and so only one such member will be described in detail. Referring primarily to FIG. 3, leaf spring bumper arrangement 16 includes a pair of leaf spring 32 and 34 mounted so as to respectively engage nylon rod bumper bar 26 on opposite ends of its travel.

Figure 5:
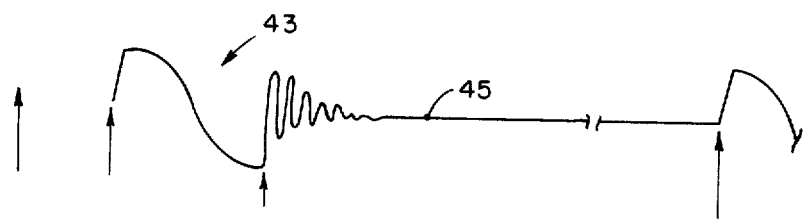
FIG. 5 is a waveform of the output signal from the sensor coil arrangement of FIG. 1 which is useful for depicting the velocity of the bumper spring during operation of the scan member.

As mirror assembly 24 (shown bottom side up in FIG. 1) rotates on flexural pivots 36 (only one of two pivots shown), bumper bar 26 engages spring 34 near the end of the scan angle labeled 38 in FIG. 3. A magnetic path is formed from a magnet 40 through leaf spring 34, sense coil 42 and housing 12; and as a result of spring 34 being deflected by bumper bar 26, the electrical signal shown by waveform 43 of FIG. 5 is produced. In the preferred embodiment, during the period that bumper bar 26 is in engagement with leaf spring 34, bumper bar 28 at the opposite end of scan member 24 (see FIG. 1) engages spring 44 (see FIG. 2) of spring bumper arrangement 14. It is to be noted that the last two mentioned springs perform the same function but the two spring mechanization is thought preferable inasmuch as it tends to produce minimal net force on the mirror, a smoother turn-around operation and it has increased reliability by duplicating the return springs, i.e., only one spring at each end is essential to operation.

Similarly, as bumper bar 26 of mirror assembly 24 engages spring 32 at the opposite end of the scan angle (labeled 38 in FIG. 3). The bumper bar 28 at the opposite end of member 24 engages lower spring 48 (FIG. 2) of bumper arrangement 14 and coil 50 provides an output signal of the type illustrated by waveform 43 of FIG. 5. Bumper bars 26 and 28 are located equidistant from the pivot axis 36 about which the scan member rotates and th surfaces of the bumper bars are parallel to the central plane of the elliptical (for example) mirror each as to cause a pair of equal and opposite turn-around forces at each of the two scan extremes.

Each of the springs, e.g. 34, is deflected away from a preload stop, for example, viscous a rubber damper, such as 52, which serves to dampen the "ringing" motion of the spring after it disengages the bumper bar. As shown in waveform 43 of FIG. 5, the dampening is such that the spring is at rest by the time the next impact by its associated bumper bar occurs. It is noted that the damper pads do not take energy from the spring until after the bumper.bar has left for the start of the next scanning period, i.e. the springs are dampened by the pads but the scan member 24 is not.

The small dampening applied to the scan member in accordance with the implementation of the subject invention reduces the amount of energy which must be added to the system by means of the torquer device. For example, the subject invention only requires one-tenth as much energy as some prior art scanner mechanizations. This decrease in the amount of power that must be added per scan makes it easier to provide for the required torque during the short turn-around period. For instance, if the scanner is operating at 10 cycles per second the turn-around time might be only 10 milliseconds.

Figure 7:
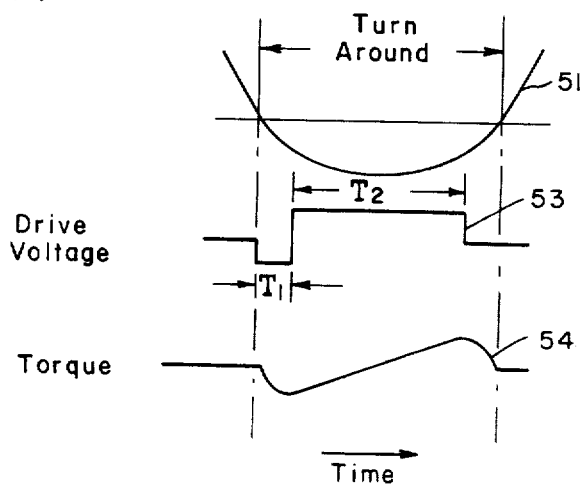

The drive voltage applied to torquer coils 22 at one end of the scan (turn-around point) is shown by bipolar signal 53 of FIG. 7 and the resultant torque is depicted by waveform 54. The signal of the drive voltage and torque waveform provided at the opposite end of the scan (the other turn-around point) will of course be opposite in polarity from that shown by waveforms 53 and 54, respectively.

Figure 4:
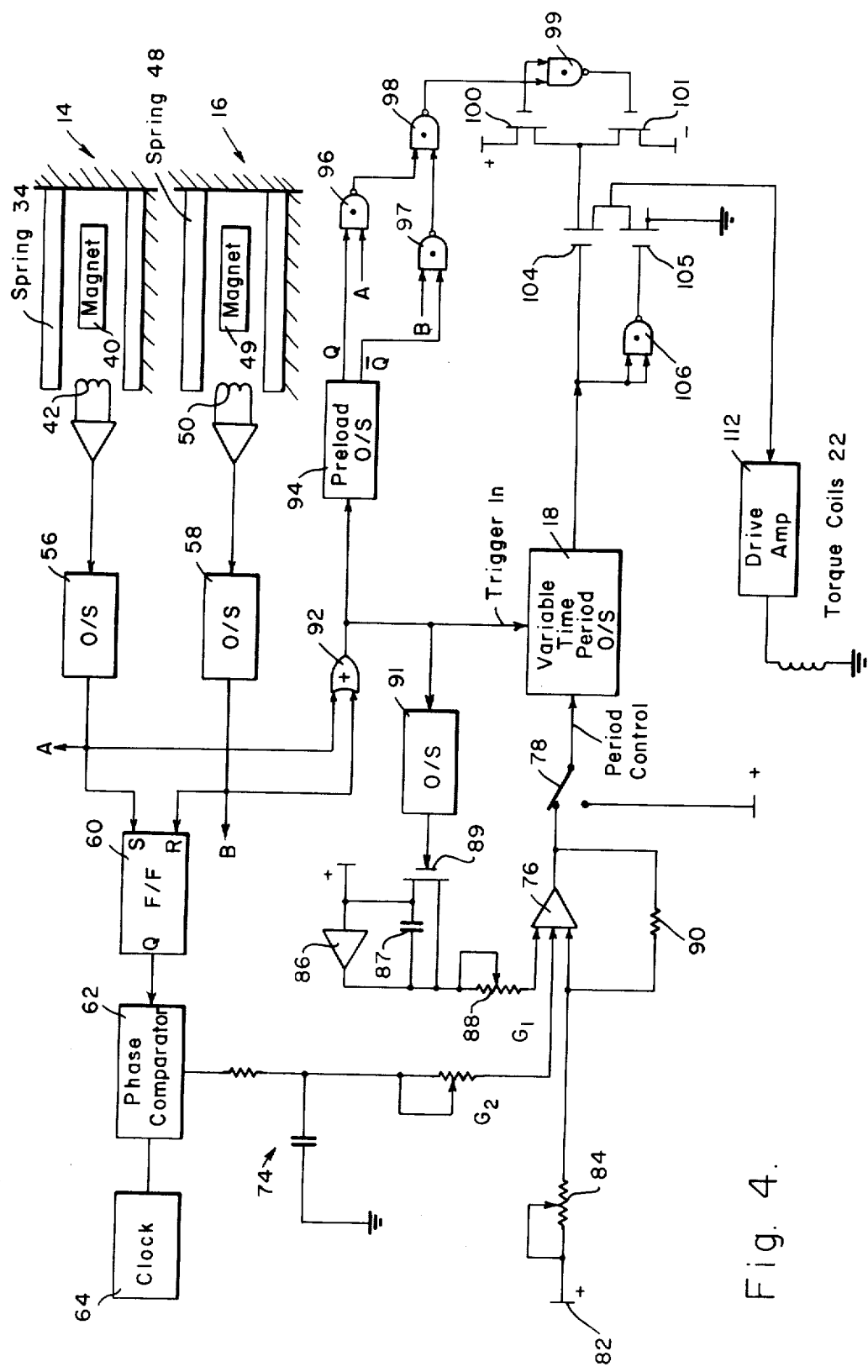
FIG. 4 is a block and schematic diagram of the circuit means used for controlling the torquer of the scan assembly of FIG. 1.

Reference is now primarily directed to FIG. 4 which shows the circuit means for driving torque coils 22. As there shown, the output signals from sensor coils 42 and 50 (see FIG. 5) are applied to monostable multivibrators, sometimes referred to as one shot (O/S) 56 and 58 respectively. The duration of the output pulse from one shot 56 and 58 extend past the point designated by reference numeral 45 in FIG. 5. This selected duration of the pulse length avoids double triggering of the one shot by the ringing portion of the output signals from the sensor coils.

The output signal from one shot 56 is applied to the "set" input of flip flop 60 and the output from one shot 58 is applied to the "rest" input terminal of said flip flop. The Q output from flip flop 60 is applied to one input of a pulse train comparator circuit (phase comparator) 62 and the other input to the comparator is from a clock generator circuit 64.

Figure 6:
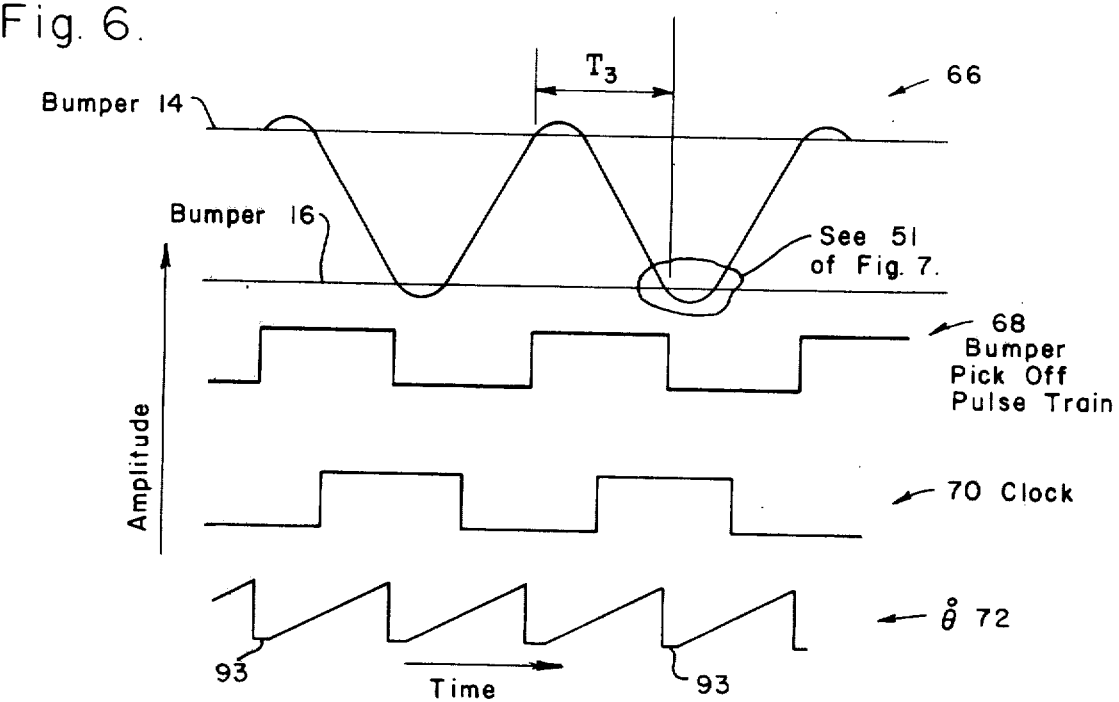
FIGS. 6 and 7 are waveforms of signals useful for explaining the operation of the drive circuit means of FIG. 5.

The angular position of scan member 24 (FIG. 1) is depicted by waveform 66 of FIG. 6; waveform 68 of FIG. 6 illustrates the output signal produced by flip flop 60 and diagram 70 illustrates the signal produced by clock generator 64.

The circuitry of FIG. 4 operates to center (time-wise) the leading edge of each of the pulses comprising the clock pulse train 70 in the corresponding pulse of bumper pickoff pulse train 68 (see FIG. 6). Hence the scan rate of scan member 24 is "locked" to the frequency of the clock pulse train. The output signal from phase comparator 62 is applied through a low pass filter 74 to one input of a summing amplifier 76. When switch 78 is in the position shown the output signal from amplifier 76 is applied to the "period control" input of a conventional variable time period monostable multivibrator (O/S) 80 and controls the time duration of its ouput pulse in a manner well known in the art.

A second input to amplifier 76 is applied from positive reference source 82 through potentiometer 84; and a third input is applied from the output of amplifier 86 through potentiometer 88. In a conventional manner, the gain of amplifier 76 is a function of the value of the feedback resistor 90.

Referring again to the righthand upper portion of FIG. 4, the output signals from one shots 56 and 58, designated A and B, respectively, are applied through an OR gate 92 to the trigger input terminal of a preload one shot 94 and to the trigger input terminal of variable time period one shot 80. The duration of the output pulse from preload one shot 94 is of a constant preselected value $\tau_1$ (see waveform 53 of FIG. 7).

The Q output signal from one shot 94 is applied in conjunction with the A signal from one shot 56 to a NAND gate 96; and the $\overline{Q}$ output is applied in conjunction with the B signal to a NAND gate 97. The output signals from gate 96 and 97 are applied to a NAND gate 98 whose output signal is applied to the gate terminal of a field effect transistor (FET) 100. Also the output signal from NAND gate 98 is inverted by gate 99 and then applied to the gate of FET 101. In response to the A signal originating from leaf bumper spring 14, elements 96 through 101 function to produce the waveform of the type shown at 53, except that the duration of $\tau_2$ continues past the point shown in waveform 53; and the complimentary signal (plurality reversal) to that just described is provided in response to the B signal originating from leaf spring bumper arrangement 16. Elements 96 through 101 function as a multiplexer between the positive and negative potential sources so that the polarity of drive voltage is correct for each turn-around point, i.e. the drive voltage at one turn-around segment is opposite in polarity from the drive voltage at the opposite turn-around portion of the scan. Also elements 99 through 101 have been shown as discrete gating stages for clarity of explanation; however, it is noted that said elements may be replaced by an integrated multiplexer unit such as a Model No. DG190BP manufactured by Siliconix Inc., Santa Clara, Calif., for example.

The output signal from variable time period one shot 80 has a time duration which is determined by the control signal applied through switch 78 and in response thereto elements 104, 105 and 106 are controlled to produce at junction 110 the output signal which is applied at junction 108, or a ground potential. This time switching or gating in response to the output signal from variable time period one shot 80 controls the time duration of the portion $\tau_2$ of the drive voltage (see FIG. 7). The duration of $\tau_2$ is controlled in a "close loop" manner such that the proper amount of energy is added to the system during each turn-around period so that the desired preselected scan frequency, i.e. the frequency of clock 64, is maintained. The output signal from junction point 110 is amplified within drive amplifier 112 and then applied to torquer coil 22 (also see FIG. 1).

It will be recalled that phase comparator 62 compares the phase of the bumper pickoff pulse train with that of the pulse train produced by clock 64 and after this angular position error signal is filtered within circuit 74 it is applied to one input terminal of summation amplifier 96. Phase comparator 62 may be a model NE565 marketed by Siliconix Inc., Santa Clara, Calif., for example.

The stability of the close loop driving arrangement of the subject invention is enhanced by the "velocity lead term" applied through potentiometer 88 to amplifier 76. To implement this function, amplifier 86 has a capacitor 87 coupled thereacross in a conventional integrator arrangement. FET 89 is connected across capacitor 87 such that when an output signal from one shot 91 is applied to gate terminal of FET 89 the gate is closed discharging the capacitor and starting a new ramp voltage upon the termination of the pulse. This implementation may be clarified by reference to waveform 72 of FIG. 6. For example, in response to either signal A or B one shot 91 is triggered by the output signal from OR gate 92. The output duration of one shot 91 is very short as shown by the segments designated by reference numeral 93 in waveform 72 of FIG. 6. Upon termination of the output signal for one shot 91 the output voltage of amplifier 86 is allowed to increase linearly until the next reset pulse is applied to FET 89. The peak value of the output signal from amplifier 86 is a direct function of the time period between turn-around signals from leaf spring bumper arrangements 14 and 16. Hence it is indicative of the velocity of the scan member.

In summary, amplifier 76 has a constant potential which is adjustable by means of potentiometer 84, a term proportional to the angular position error of the scan member relative to the frequency of clock 64, and a velocity lead term supplied from the arrangement which includes amplifier 86.

To summarize the operation of the subject invention, scan member 24 (FIG. 1) rotates on flexural pivots 36 with leaf spring bumper assemblies 14 and 16 absorbing the rotational energy and reapplying most of this energy (e.g. 90%) so as to cause the member to scan in the opposite direction. During each turn-around period torquer 22 provides the exact amount of additional energy required to maintain a predetermined constant scan rate.

Initial start up of the assembly may be accomplished in a conventional manner by means which could include an additional high powered torquer with associated drive circuitry used only to start the scan member into rotation at approximately the correct scan rate, and during startup operations torquing means may not be limited to the turn-around portion of the scan.

The start of each turn-around period is sensed by coils 42 and 50 and the drive voltage (or its complement) shown in waveform 53 of FIG. 7 is developed by the circuit means of FIG. 4 with the resultant torque shown by waveform 54. With respect to the drive voltage pulse 53, the portion $\tau_1$ thereof is of a constant time duration which is selected such that when the system is operated at the frequency of clock 64 and when equal positive and negative drive voltage amplitudes are employed, the sum of the time duration $\tau_1$ and $\tau_2$ is minimized. The duration of the $\tau_2$ portion of waveform 53 is the control variable and is equal to a constant $+G_1$ $(\tau_4-\tau_3)+G_2(\epsilon)$; where $G_1$ and $G_2$ are gain values, $\tau_3$ is the time between the last two impacts, $\tau_4$ is a constant and equal to $\tau_3$ if the mirror speed, $\dot{\theta}$, were correct between the last two impacts, and $\epsilon$ is the phase error $(\theta_{clock} - \theta_{pickoff\ train})$ between the pulse train of clock 64 and the bumper pickoff pulse train. $G_1$ and $G_2$ are gain values selected for smooth operation.

It is noted that when switch 78 of FIG. 4 is in the position opposite from that shown the system will operate at a substantially constant scan rate; however the rate will be determined by the parameters of the system and not "lock" to the frequency of clock 64.

Thus having described a new and useful "torque while turn-around" scan mirror assembly which provides highly linear and repeatable scans in each of two scan directions while requiring relatively low power.

What is claimed is:

1. A scan assembly comprising a housing, a scan member mounted by means of flexural pivots to said housing, a torquer device mounted between said scan member and said housing for providing in response to an applied electrical control signal, energy to said member so as to cause it to rotate on said flexural pivots, at least two spring means each of which are disposed for contacting said scan member near the end of its travel in one respective direction, for absorbing energy therefrom and for reapplying a portion of said energy to drive said member in the opposite direction, said spring means each include at least one leaf spring mounted so as to be in substantial engagement with said scan member during at least a portion of the turn-around period at the end of each scanning cycle, and wherein the improvement comprises circuit means for sensing the contact of said scan member with said spring means and for applying a control signal to said torquer so as to impart during the turn-around period of said scan member the energy required to maintain a substantially constant scan rate for said member with said control signal comprising first and second segments of opposite polarity and poled so as to drive said torquer device to add energy to the scan mirror assembly during the deflection and return travel portions of the movement of said leaf springs and said circuit means including means for comparing the scan angle sequence of said member to that of a reference signal pulse train and for controlling the duration of said control signal so as to substantially maintain a scan angle sequence which is determined by said reference signal pulse train.

2. The scan assembly of claim 1 wherein said circuit means further includes means for measuring the scan rate of said member and for modifying said control signal as a function thereof, whereby the operating stability of said scan assembly is improved.

3. The scan assembly of claim 1 wherein said leaf springs are tapered and are so mounted on said frame as to allow the tapered end thereof to engage said scan member.

4. The scan assembly of claim 1 wherein said circuit means each include a magnet and a sensing coil disposed so as to form a series magnetic circuit with said leaf spring whereby movement of said leaf spring produces an electrical output signal from said sense coil and means reponsive to said output signal for commencing said control signal.

5. A scan assembly comprising:
a housing;
a scan member mounted for rotation on said housing;
a torquer device mounted between said scan member and said housing for providing in response to an applied electrical control signal, energy to said member so as to cause it to rotate, with respect to said housing;
a least two spring means each of which are disposed for contacting said scan member near the end of it travel in one respective direction for absorbing energy therefrom and for reapplying a portion of said energy to drive said member in the opposite direction;
circuit means for sensing the contact of said scan member with said spring means and for applying a control signal to said torquer so as to impart during the turn-around period of said scan member the energy required to maintain a substantially constant scan rate for said member, said circuit means including means for comparing the scan angle sequence of said member to that of a reference signal pulse train and for controlling the duration of said control signal so as to substantially maintain a predetermined scan angle sequence, and means for measuring the scan rate of said member and for modifying said control signal as a function thereof.

6. The scan assembly of claim 5 wherein said spring means each include at least one leaf spring mounted so as to be in substantial engagement with said scan member during at least a portion of the turn-around period at the end of each scanning cycle.

7. The scan assembly of claim 6 wherein said leaf springs are tapered and are so mounted on said frame as to allow the tapered end thereof to engage said scan member.

8. The scan assembly of claim 6 wherein said circuit means each include a magnet and a sense coil disposed so as to form a series magnetic circuit with said leaf spring whereby movement of said leaf spring produces an electrical output signal from said sense coil and means responsive to said output signal for commencing said control signal.

* * * * *